United States Patent [19]

Scott et al.

[11] Patent Number: 5,910,857
[45] Date of Patent: Jun. 8, 1999

[54] LASER AMPLIFIER

[75] Inventors: Andrew Maxwell Scott; Kevin Dennis Ridley, both of Malvern, United Kingdom

[73] Assignee: The Secretary of State for Defence in Her Britannic Majesty's Government of the United Kingdom of Great Britain and Northern Ireland, Hants, United Kingdom

[21] Appl. No.: 08/894,194

[22] PCT Filed: Jan. 23, 1996

[86] PCT No.: PCT/GB96/00133

§ 371 Date: Aug. 14, 1997

§ 102(e) Date: Aug. 14, 1997

[87] PCT Pub. No.: WO96/26561

PCT Pub. Date: Aug. 29, 1996

[30] Foreign Application Priority Data

Feb. 20, 1995 [GB] United Kingdom ............... 9503301

[51] Int. Cl.[6] ............................................ H01S 3/00
[52] U.S. Cl. ............................................... 359/338
[58] Field of Search ................................. 359/334, 338, 359/347, 349

[56] References Cited

U.S. PATENT DOCUMENTS

| 4,757,268 | 7/1988 | Abrams et al. | 330/4.3 |
| 4,794,345 | 12/1988 | Linford et al. | |
| 5,689,363 | 11/1997 | Dane et al. | 359/334 |
| 5,717,516 | 2/1998 | Klein et al. | 359/334 |

FOREIGN PATENT DOCUMENTS

0422468 A2 4/1991 European Pat. Off. .

OTHER PUBLICATIONS

IEEE Journal of Quantum Electronics, vol. 27, No. 1, Jan. 1991, New York US, pp. 135–141, XP000000002002222 N.F.Andreev et al.: "Locked phase conjugation for two--beam coupling of pulse repetition rate solid–state lasers" cited in the application see figure 5.
IEEE Journal of Quantum Electronics, vol. 24, No. 6, Jun. 1988, New York US, pp. 1124–1140, XP002002223 D.A. Riclwell: "A review of phase–conjugate solid–state laser" cited in the application see figures 9, 11.
Applied Optics, vol. 32, No. 30, Oct. 20, 1993, New York US, pp. 6183–6186, XP002002224 X.Hua et al.: Polarization–dependent phase locking in stimulated Brillouin scattering system: see abstract; figure 2.
FJournal of the Optical Society of America—B, vol. 11, No. 5, May 1994, New York US, pp. 786–788, XP002002225 N.F.Andreyev et al.: "Phase–conjugation fidelity fluctuation for various stimulated Brillouin–scattering mirror geometries" see figure 1.
Journal of the Optical Society of America—B, vol. 12, No. 10, Oct. 1995, New York US, pp. 1924–1932, XP002002226 K.D. Ridley: "Phase–locked phase conjugation by Brillouin--induced four–wave mixing" see figure 5.

*Primary Examiner*—Mark Hellner
*Attorney, Agent, or Firm*—Nixon & Vanderhye P.C.

[57] ABSTRACT

A phase locked phase conjugation system comprises a first (1) and a second (2) stimulated Brillouin scattering (SBS) cell. A laser beam is split into sub beams; one (9) is directed through the first SBS cell as a beam of collimated light and focused into the second SBS cell from which a phase conjugated beam is returned. One or more other sub beams (11, 12) are focused into the first SBS cell so that overlap occurs between focused sub beams and collimated beam. This provides a phase locked phase conjugated beam. Two or more sub beams are directed twice through laser amplifiers to provide an amplified phase locked phase conjugated beam. The second SBS cell may be a simple reflective cell operating on a focused laser sub beam, or may be an SBS loop arrangement having reflectors and lenses for causing optical feedback of the Brillouin scattered light.

9 Claims, 6 Drawing Sheets

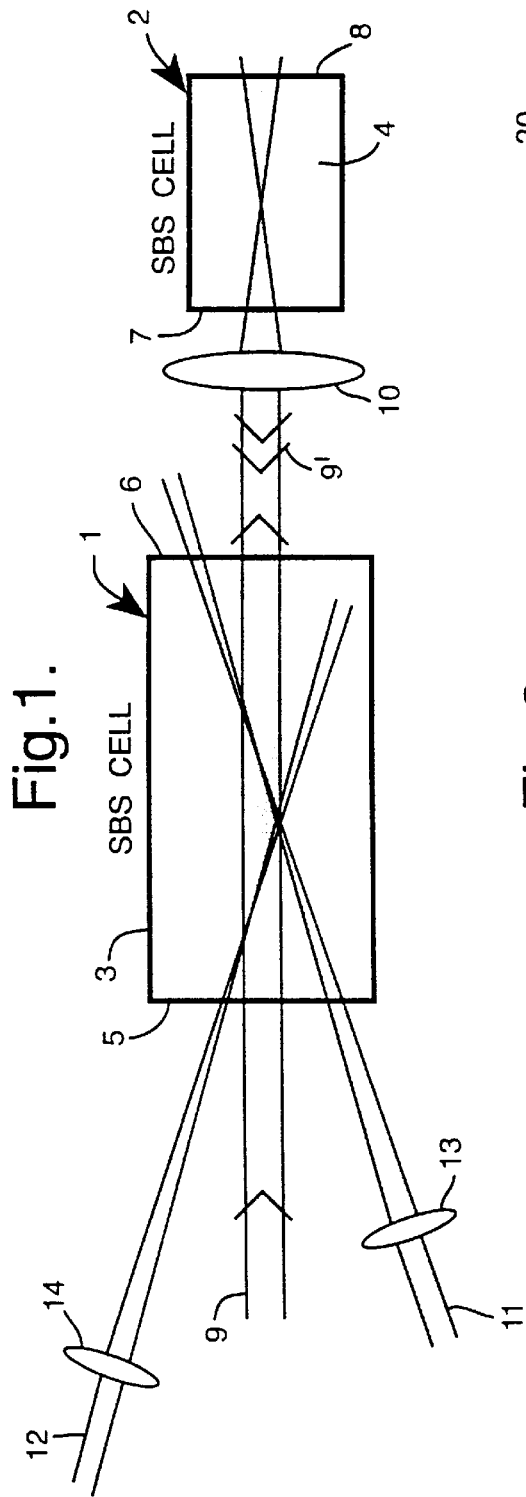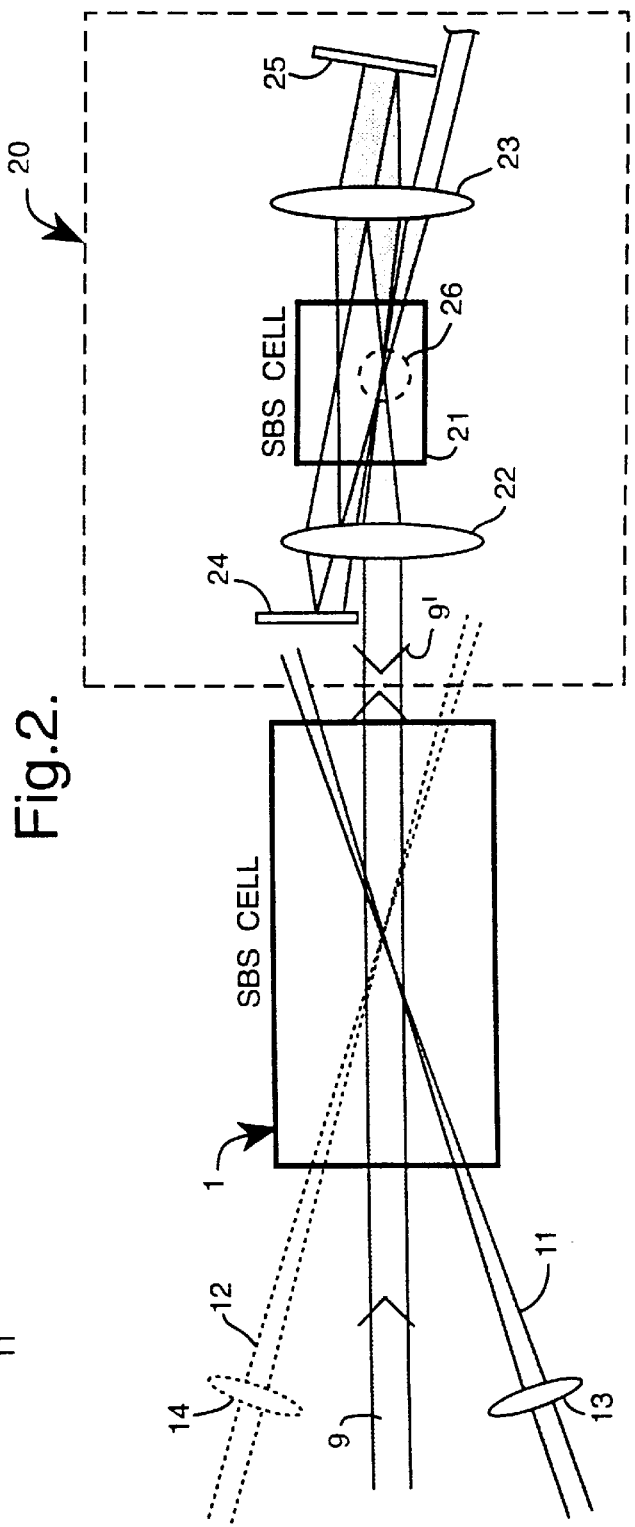

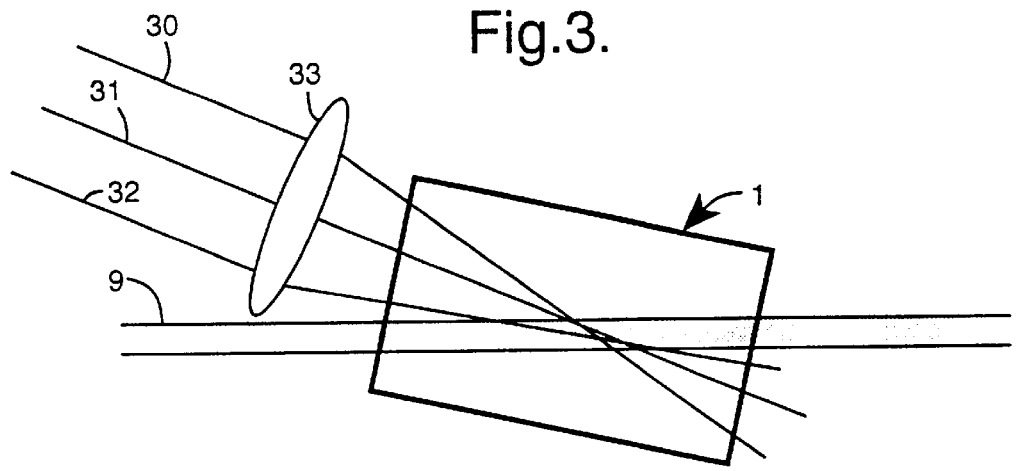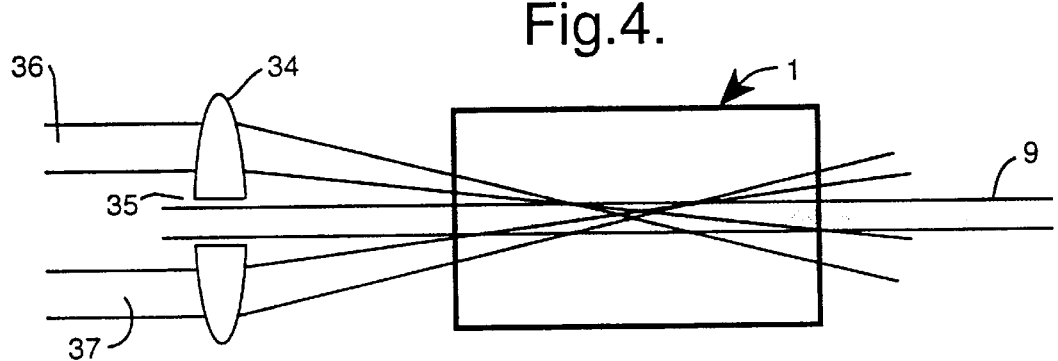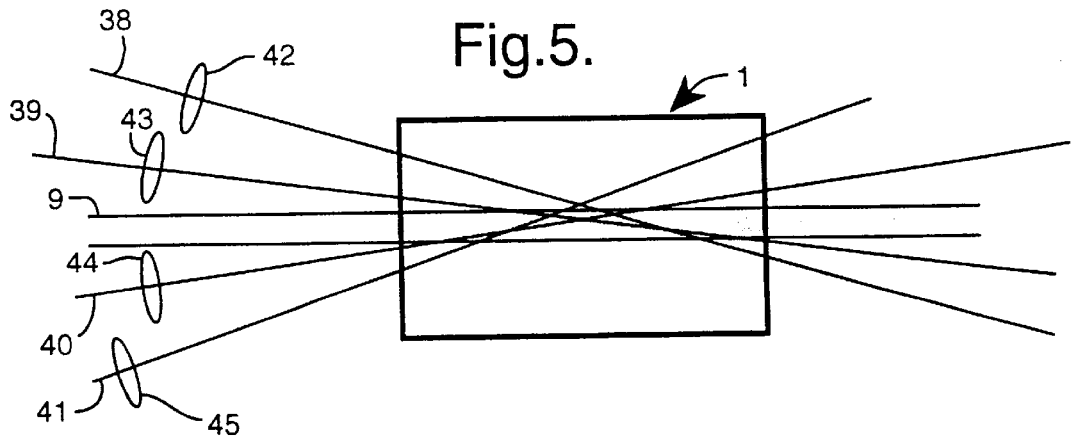

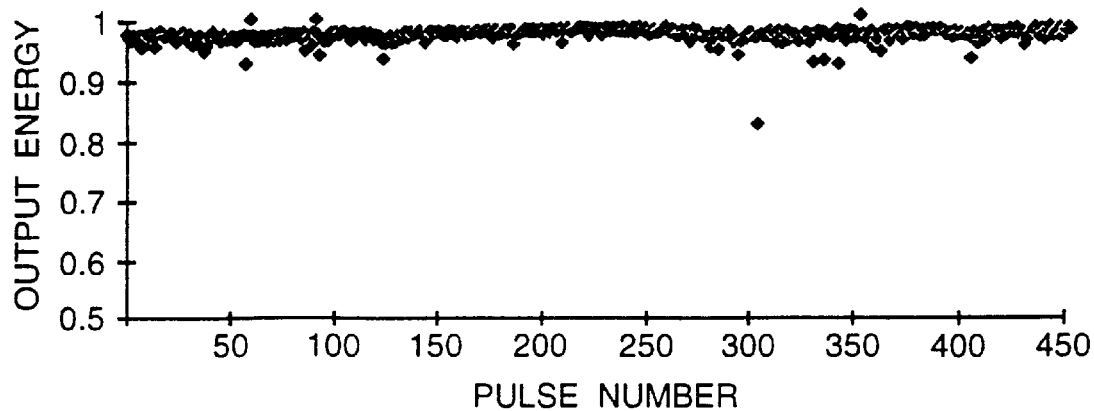
Fig.7a. PRIOR ART SYSTEM OVERLAPPING FOCUS SBS
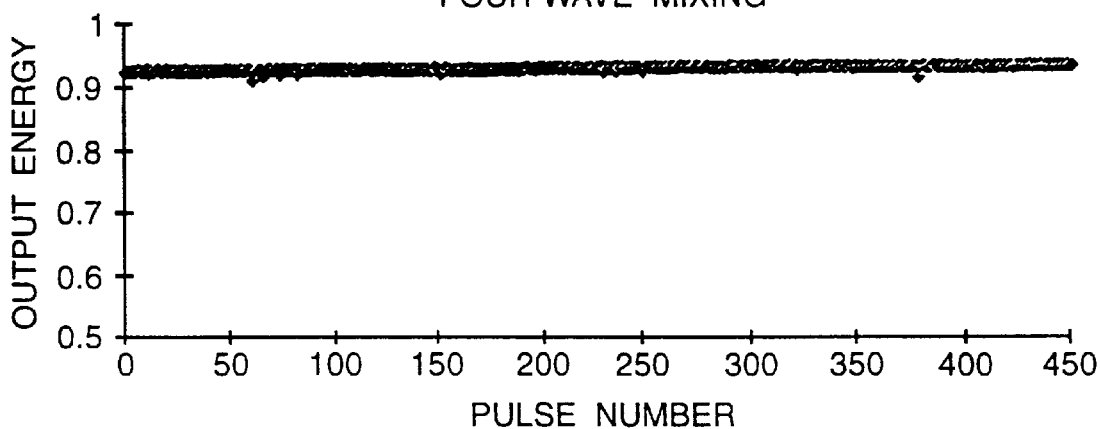
Fig.7b. PRIOR ART SYSTEM FOUR-WAVE MIXING
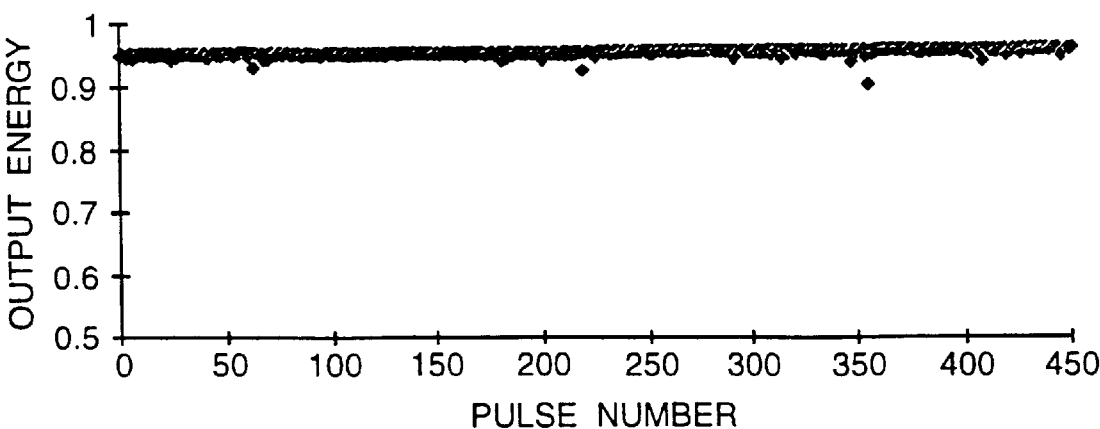
Fig.7c. ARRANGEMENT

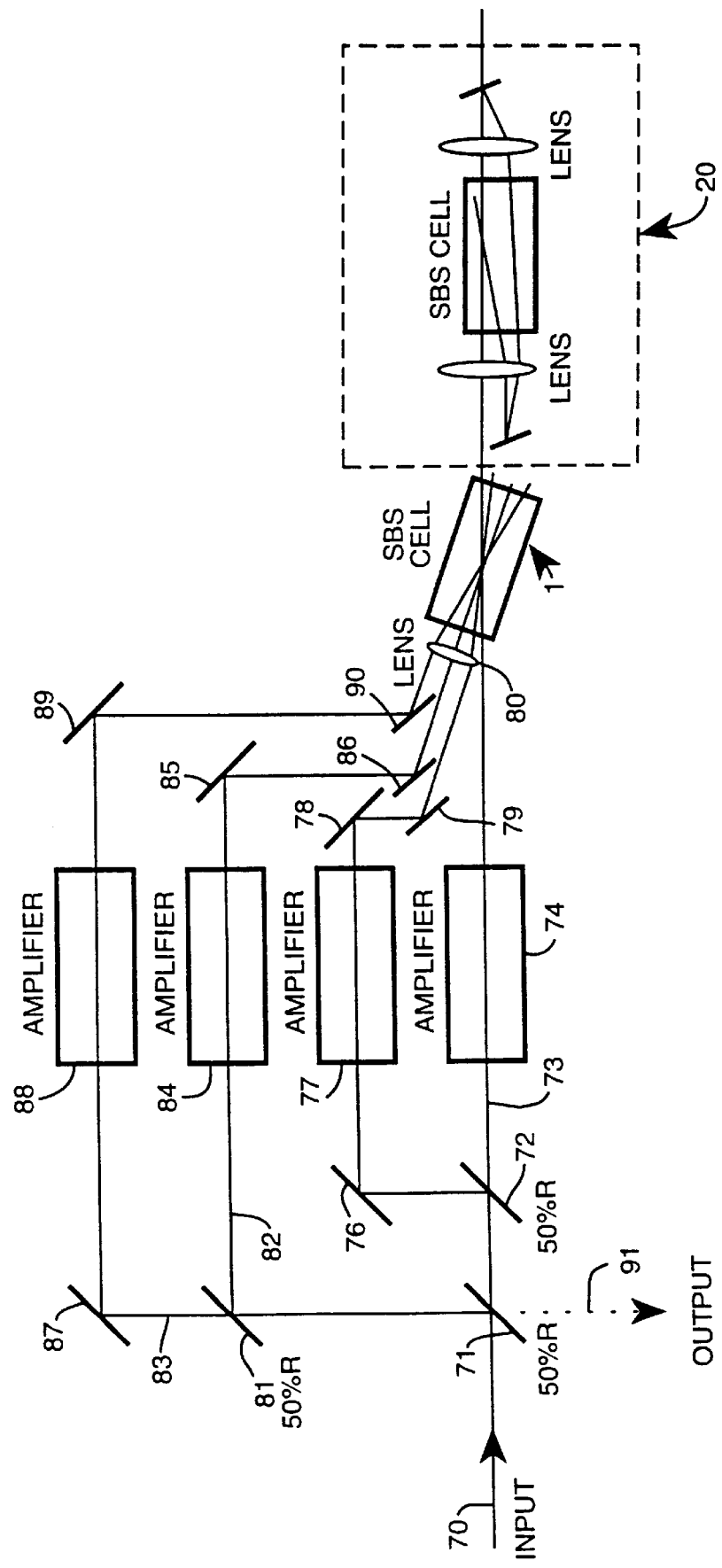

LASER AMPLIFIER

BACKGROUND OF THE INVENTION

1. Field of the Invention

This invention relates to laser amplifiers employing phase locked phase conjugation, and to a system for providing such phase locked phase conjugation.

2. Discussion of Prior Art

Beams of laser light may be amplified by passing a beam through an amplifying medium which is pumped with light energy, eg a flash lamp. The beam interacts with pump energy in the amplifying medium and an amplified output is obtained. It is known to reflect an amplified beam by a mirror so that the laser beam passes twice through the amplifier with consequential gain. There are several limits upon the amount of amplification that can be obtained. Increasing the cross section area and or length of the medium causes problems of cost and medium inhomogeneity. Another problem concerns heat build up in the medium.

To overcome the above, it is known to split a laser beam into several beams and pass each sub-beam through amplifiers. The amplified sub-beams are recombined. Unfortunately, phase coherence is lost in this arrangement.

Several attempts have been made to split, amplify, and recombine a laser. Some attempts have used phase locked phase conjugation techniques (phase locked phase conjugation has also been referred to as "beam combining" or "coherent coupling").

Phase locked phase conjugation is a variant of the technique of optical phase conjugation. In optical phase conjugation a "time reversed" replica of an optical beam is produced when the beam is incident upon a "phase conjugate mirror" (PCM). The time reversed, or phase conjugate, beam exactly retraces the path of the original beam.

One application of phase conjugation is for removing abberations in a double pass of a laser amplifier (D. A. Rockwell. "A review of phase-conjugate solid-state lasers", IEEE J. of Quantum Electron., 24, p1124 (1988)).

In another arrangement a laser beam was divided by a beam splitter mirror into two sub beams and each sub beam directed through an amplifier into a simulated Brillouin scattering (SBS) mirror. The SBS mirror reflects the two beams back through the amplifiers and onto the beam splitter mirror. Unfortunately the two amplified beams will have randomly different phases. As a result, when the amplified beams return to the beam splitter only part of the beams will go back along the direction of the original beam. Instead randomly different amounts will reflect off the beam splitter and pass through it. Use of independent PCMs will not give phase locking with amplification. Phase locking with phase conjugation has been reported by Basov (N. G. Basov, V. F. Efimkov, I. G. Zubarev, A. V. Kotov, S. I Mikhailov, and M. G. Smirnov, "Inversion of wavefront in SMBS of a depolarised pump", JETP Lett. 28, p197 (1978)). In these experiments a single depolarised beam was split into two beams, the two beams were directed on to an aberrator, which was imaged into an SBS cell containing a waveguide. The function of the abberator and the waveguide is to obtain a high degree of overlap between the two beams so that they are reflected from a common SBS grating within the SBS medium.

Basov et al also described phase locking with up to nine beams. This was achieved by using a waveguide to get overlap between the beams. An auxiliary reference beam was also used to improve phase locking. Problems associated with these schemes involving waveguides are less than perfected phase conjugate fidelity (near field speckle on the output beams is a particular problem), and low reflectivity (the maximum reflectivity achieved in Basov was 15%). Another limitation with using a waveguide is that the refractive index of the SBS medium must be greater than that of the waveguide material in order for waveguiding to take place. This places severe restrictions on the choice of SBS media. Another known system is described in D. A. Rockwell and C. R. Giuliano, "Coherent coupling of laser gain media using phase conjugation", Optics; Letters, 11, p147 (1986) Carroll et al, Journal of the Optical society of America B, Vol. 9, p.2214, (1992. It does not use a waveguide; and/or abberator, but achieves overlap by focusing the beams down with a lens and making them parallel so that they overlap in the focal region of the lens (the far field) and thus share a common SBS grating. The major disadvantage of this technique is a very high degree of sensitivity to misalignment (S. Sternklar, D. Chomsky, S. Jackel, and A. Zigler, Misalignment sensitivity of beam combining by stimulated Brillouin scattering.", Optics Letters, 15, p.469 (1990)), which makes it difficult to use in a practical system".

Another known system has been published by N. F. Andreev, E. A. Khazanov, S. V. Kuznetsov, G. A. Pasmanik, E. I. Shklovsky and V. S. Sidorin, IEEE J. of Quantum Electron., Vol 27, p135 (1991). This is based on four wave mixing between two beams that have orthogonal polarisation states. This technique gives good phase locking and phase conjugate fidelity, as well as being relatively insensitive to misalignment. Its main drawback is that it requires increased complexity if more than two beams are to be phase locked.

SUMMARY OF THE INVENTION

The above problems of providing phase locking that is easy to set up and can handle multiple beams is solved, according to this invention, by directing one or more focused beams into the region of a Brillouin cell in which a single collimated beam and its phase conjugate are propagating. This allows the focused beams, and if required. the collimated beam to be amplified individually and recombined to a single amplified beam with phase coherence. The phase conjugate of the collimated beam is produced by SBS in a separate focus, which may be in a second Brillouin cell and may involve the use of optical feedback.

According to this invention a phase locked phase conjugation system, suitable for use with laser amplifiers, comprises:

means for providing a beam of laser light;
 means for splitting the beam into sub-beams;
 a first and a second Brillouin (SBS) cell capable of providing phase conjugation;
 means for collimating one of the sub-beams and directing the collimated sub-beam through the first SBS cell;
 means for directing and focusing at least two or more sub-beams into the first SBS cell to overlap with the collimated beam at different regions of the volume traversed by the collimated sub-beam; and
 means for directing and focusing the collimated sub-beam from the first SBS cell into the second cell so that a phase conjugated sub-beam is reflected and returned from the second SBS cell back into the first SBS cell for mixing with the original collimated beam;
 means for directing and focusing at least two or more sub-beams into the first SBS cell to overlap with the collimated beam at different regions of the volume traversed by the collimated sub-beam; and means for recombining at least some of the sub-beams into a single coherent light beam;

the arrangement being such that phase locked phase conjugation of the sub beams occurs within the volume within the first SBS cell, and the recombined light beam has a spatial phase substantially the same as the original beam.

According to this invention a laser amplifier comprises the above phase locked phase conjugation system in combination with laser amplifiers through which the sub-beams pass at least once; the laser amplifiers comprising a laser amplifying medium with means for supplying pump energy into the medium.

The second SBS cell may be a simple reflective phase conjugation cell, or a transmissive SBS cell with means for returing the transmitted beam back to overlap with the original input beam to provide optical feedback.

The phase locked phase conjugation system may be used to correct for changes in the polarisation state of a laser beam. A beam that has had its polarisation state altered by passing through an optical element, is split into two sub beams by a polarising beam splitter. These two beams undergo phase locked phase conjugation and recombine at the beam splitter. The resulting beam passes back though the optical element and has its polarisation state restored to that of the original laser beam.

The means for producing a laser beam may be a Q-switched Nd:YAG laser operating at 1.064 $\mu$m, pulse duration 30 ns, and pulse energy 15 mJ.

The laser amplifiers may be Nd:YAG rods, pumped by flash lamp.

The SBS medium may be the liquid Titanium tetrachloride.

BRIEF DESCRIPTION OF THE DRAWINGS

The invention will now be described, by way of example only, with reference to the accompanying drawings of which:

FIG. 1 is a schematic diagram showing phase locked phase conjugation using two SBS cells to lock two laser beams using a third beam that is not necessarily recombined with the other two;

FIG. 2 is similar to FIG. 1 but using a loop arrangement with the second SBS cell. In this arrangement all of the beams are recombined:

FIGS. 3, 4, 5 show different ways of focusing multiple laser sub beams into an SBS cell;

FIGS. 7a,b,c, 8a,b show plots of results obtained by the arrangement of FIG. 6; and FIG. 9 shows an arrangement for splitting a laser beam into four sub beams, amplifying each sub beam, phase locking with phase conjugation, and recombining into a single beam having phase coherence.

DETAILED DISCUSSION OF PREFERRED EMBODIMENT

Figure 6:
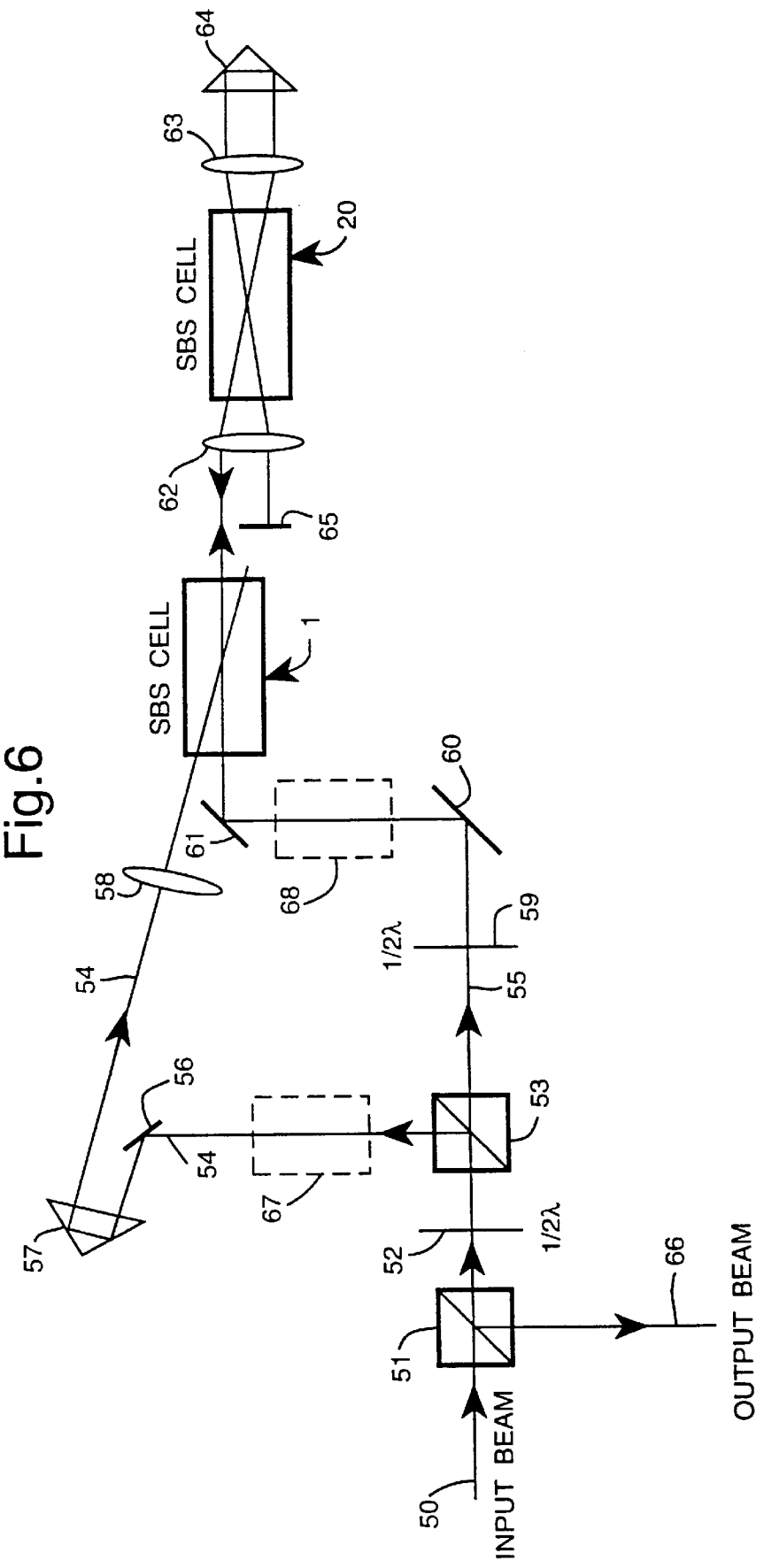
FIG. 6 shows a layout dividing a single laser beam into two sub beams for phase conjugation using the arrangement of FIG. 2.

As shown in FIG. 1 a phase locked phase conjugation system comprises a first 1 and a second 2 Simulated Brillouin Scattering (SBS) cell. The cells 1, 2 may contain the liquid Titanum Tetrachloride 3, 4 between flat and polished end faces 5, 6 and 7, 8. Alternatively the second SBS cell 2 may be formed of a long phonon lifetime SBS medium eg a compressed gas such as Xenon.

A laser sub beam 9 is directed through the first cell 1 as a collimated beam of typically 3 mm diameter. This sub-beam 9 is then focused by a lens 10 into the second SBS cell 2. Such a focusing at a sufficiently high power density causes phase conjugation and reflection of a phase conjugated beam 9' back along the same path through the first SBS cell 1.

Two or more other sub beams 11, 12 that are to be phase locked are focused into the first cell 1 so that they overlap with the collimated beam 9, and four-wave mixing between these beams 11, 12 and the collimated beam 9, 9' causes phase locking to take place. Such four-wave mixing is formed by the collimated sub beam 9 and its phase conjugate beam 9' from the second SBS cell 2 interacting with the focused sub beams 11, 12 causing phase conjugation of the focused sub beams 11, 12.

Normally phase conjugation occurs by a noise initiated process within a region of intense light energy. In the system of FIG. 1 the phase conjugation within the first SBS cell 1 is caused by the collimated sub-beam returning to the second SBS cell 2 and not noise generation. For this to happen the first SBS cell 1 must receive the collimated beam ahead of receiving the focused sub-beams 11, 12. This may be achieved by suitable variation of the path lengths of the sub beams 11,12 as explained later.

An advantage of the system of FIG. 1 is the ease of achieving overlap between the collimated 9 and focused sub beams 11, 12. The focus or waist of the sub-beams 11, 12 is quite small in comparison with the collimated sub-beam 9 diameter. This makes for easy set up of an amplifier. When multiple focused sub-beams are used it is only necessary to focus them within the collimated beam 9 inside the first SBS cell 1, and not all in the same position. This is shown clearly in FIG. 1 where the sub beam waists are separated by several cms along the collimated beam 9.

A limitation of the system in FIG. 1 is that if the laser pulse duration is longer than the phonon lifetime of the SBS medium, which is a time constant that characterises the response of the SBS medium, the phase of the beam 9' fluctuates with respect to that of the phase conjugates of 11 and 12. and so cannot be effectively recombined with these beams. This problem can be overcome either by not allowing beam 9' to recombine with the phase conjugates of 11 and 12, or by using the system shown in FIG. 2.

The system of FIG. 2 is similar to that of FIG. 1 with the second SBS cell 2 and lens 10 replaced by an SBS loop system 20. The loop 20 comprises a second SBS cell 21 arranged between two 9 cm focal length lenses 22, 23 and two reflectors 24, 25 forming an SBS loop geometry which produces a phase conjugate 9' of the collimated sub beam 9. In the loop scheme the input beam 9 goes through the second SBS cell 21 a first time, is directed by reflector 25 back through the SBS cell 21 a second time without overlap with the first transit, then by reflection from reflector 24 back through the SBS cell 21 a third time with the third transit path overlapping the first transit path. Such an overlap is indicated at 26 and sets up a phase conjugation reflection 9' back into the first SBS cell 1.

The arrangement shown in FIG. 2 is one way of realising the loop geometry. There are other ways. The feature they all have in common is the provision of an optical feedback loop for Brillouin scattered light.

Two or more other sub-beams 11, 12 that are to be phase locked are focused into the first cell 1 so that they overlap with the collimated beam 9, and four-wave mixing between these beams 11, 12 and the collimated beam 9, 9' causes phase locking to take place as in the FIG. 1 arrangement. The SBS loop scheme eliminates phase fluctuations in the phase conjugate of the collimated beam, which greatly improves the accuracy of the phase locking when 9' is recombined with the phase conjugates of 11 and 12.

Other ways of directing sub beams into the first SBS cell are shown in FIGS. 3, 4, 5. In FIG. 3 three separate sub beams 30, 31, 32 are focused by a single lens 33 into the SBS cell 1 and their waists overlap the collimated beam 9. In FIG. 4 a single focusing lens 34 has a cental hole 35 through which the collimated sub beam 9 passes. Sub beams 36, 37 are focused by the outer parts of the lens 34. In FIG. 5 four sub beams 38, 39, 40, 41 each have their own focusing lens 42, 43, 44, 45. As shown in FIGS. 3–5 the sub beams are in a single plane, in practice they may be in different planes.

FIG. 6 shows an arrangement for providing phase locked phase conjugation and amplifying the output 50 of a laser (not shown). The laser is a Q-switched Nd:YAG laser operating at 1.064 µm wave length. The pulse duration was 30 ns, and the laser operated in a single longitudinal and single transverse mode. The pulse energy was 15 mJ.

The collimated laser beam 50 to be amplified and phase locked conjugated is first incident on a polarising beam splitter 51 orientated to transmit the beam 50. This is followed by a half-wave plate 52 that rotates the polarisation direction by 45°. A second polarising beam splitter 53 reflects 50% to form a first sub beam 54 and transmits 50% to form a second sub beam 55. The first sub beam 54 is directed by a mirror 56 to a prism 57, which allows the path length to be varied, after which it is focused into a Brillouin cell 1 by a 10 cm focal length lens 58. The Brillouin cell 1 contains the liquid Titanium Tetrachloride.

The second sub beam 55 has its polarisation rotated by 90° by a half waveplate 59 so it becomes parallel to that of the first. The second sub beam 55 is reflected off two mirrors 60, 61 and is sent through the cell 1 so that there is overlap between this collimated sub-beam 55 and the focused beam 54 in the region of the focal waist. The diameter of the second sub-beam 55 in the overlap region is 3 mm. The second sub-beam 55 is then focused into a second Brillouin cell 21 by a 9 cm focal length lens 62. The transmitted beam is re-collimated by a second 9 cm focal length lens 63 placed 22 cm away from the first 62. The beam is then directed back to the lens 63 by a right-angled prism 64.

The prism 64 is tilted upwards slightly (out of the plane of the paper in the figure) so the returning beam is not quite parallel to the incident beam. This ensures that the returning beam does not overlap the input beam at the focus of the lens 62, as this may be detrimental to the phase conjugation process. After being re-collimated by the first lens 62, the beam is sent back into the Brillouin cell 21 via a 100% reflecting mirror 65. This mirror 65 is tilted to make the reflected beam parallel to (but displaced from) the original input beam. The reflected beam is not shown on the diagram because it lies directly beneath the incident beam. The reflected beam then overlaps the input beam at the focus of the lens 62, completing the so-called "loop" phase conjugation geometry as in FIG. 2 and in A. M. Scott, W. Whitney, M. Duignan. J. Opt. Soc. Am. B, in press.

The phase conjugate beam from the loop then returns along the path of the input sub beam 55 via the half wave plate 59 to the polarising beam splitter 53. The phase conjugate of the first sub beam 54 is produced in the first SBS cell 1.

The prism 57 is used to adjust the path length of the first sub beam 54 to achieve two things:

1) To ensure that the path length for the first sub beam 54 is sufficiently long so that the second sub beam 55 and its phase conjugate 55' are both present in the first SBS cell 1 before the first sub beam 54 attains the SBS threshold intensity in this cell 1 (this allows for the suppression of SBS noise, which is the usual initiator of the SBS phase conjugate output).

2) To make the path length an odd number of SBS coherence lengths, so that the phase conjugate beams 54', 55' arrive back in at the second polarising beam splitter 53 with a 180° phase shift. This allows the phase-locked output to be coupled out from the first polarising beam splitter 51 rather than following the path of the input beam 50. The path length can also be set to give zero phase shift, in which case the phase conjugate 54', 55' retraces the path of the original beam 50, and a non-reciprocal element (such as a Faraday isolator) is needed to extract it before it returns to the laser (not shown). Some kind of matching of the path length difference to multiple SBS coherence lengths is necessary in any scheme in which the returning phase conjugates have a Stokes frequency shift with respect to the inputs. (ie most schemes that employ SBS). The path length needs to be controlled to a precision on the order of a few millimeters (depending on the Brillouin frequency shift of the SBS medium used).

To obtain amplification the first and second sub beams 54, 55 are passed through laser amplifiers 67, 68 indicated in broken lines. The total amplification is approximately twice that which could be achieved by double passing the beam 50 through a single amplifier.

FIG. 7c shows the output energy from the system of FIG. 6 for a series of laser pulses, plotted as a fraction of the total reflected energy (the remaining few percent of the output goes back along the direction of the original beam). Any deviation in the phase locking shows up as fluctuations in this output. Also shown for comparison in FIGS. 7a,b are results using two well known existing techniques for phase locked phase conjugation, namely overlapping focus SBS and four wave mixing.

Figure 8A:
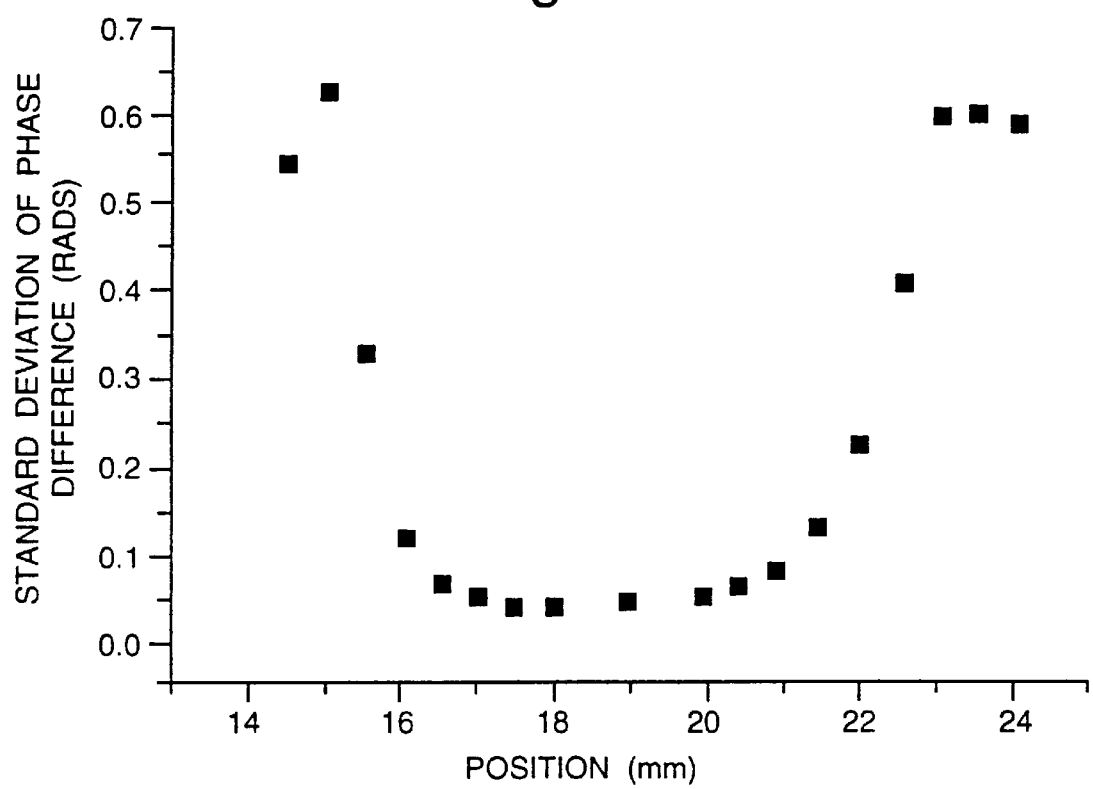
Figure 8B:
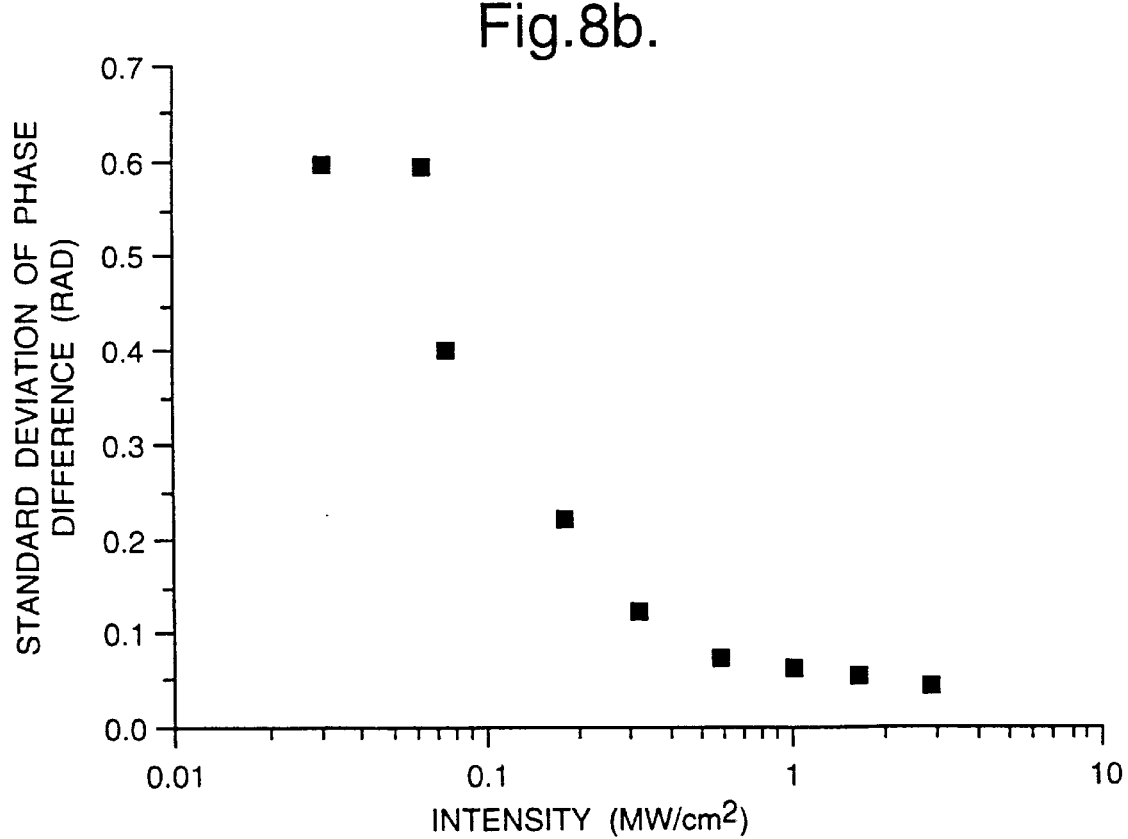

One advantage of the arrangement of FIG. 6 is its insensitivity to changes in alignment between the two beams 54, 55. This was investigated by translating the focused beam 54 across the collimated beam 55 while monitoring the phase locking. The results are shown in FIG. 8a, plotted as the standard deviation of the phase fluctuations versus the position in the collimated beam. It can be seen that good phase-locking is obtained across the entire beam ($1/e^2$) diameter. This data is used to plot (in FIG. 8b) the standard deviation of the phase fluctuations as a function of the geometric mean of the input and phase conjugate intensities of the collimated beam 55.

FIG. 9 shows an arrangement for amplifying a laser beam 70 by splitting the beam into four sub beams, each amplified twice, phase locked and phase conjugated.

A laser beam 70 is directed onto a partial reflector 71 which reflects 50% and transmits 50% of the light to a second partial reflector 72 which reflects 50% and transmits 50%. The latter transmitted light forms a first sub beam 73 which is passed through a first amplifier 74 and directed as a collimated beam into a first SBS cell 1 and onto an SBS loop 20 as in FIG. 2 with identical reference numerals.

Light reflected off the second partial reflector 72 forms a second sub beam 75. It is reflected off reflector 76 into a second amplifier 77 then off reflectors 78 and 79 focused by a lens 80 so that the beam waist is within the volume of the collimated first sub beam 73 in the first SBS cell 1.

Light reflected off the first partial reflector 71 has 50% reflected by a partial reflector 81 to form the third sub beam 82, and 50% transmitted to form a fourth sub beam 83. The third sub beam 82 is amplified in a third amplifier 84 then directed by mirrors 85, 86, then through the lens 80 into the first SBS cell 1. Similarly the fourth sub beam 83 is reflected off mirror 87, through a fourth amplifier 88, directed by mirrors 89, 90, through the lens 80 and into the first SBS cell 1.

The focused waist of the second, third and fourth sub beams 75, 82, 83 are all within the collimated first sub beam 73 as shown in FIG. 2. As in the arrangements of FIGS. 2, and 3 all sub beams return to the first partial reflector 71 where they are all combined with phase coherence and eight time amplification to reflect off as the output beam 91.

A phase conjugated output 91 is reflected off the first partial reflector 71 (rather than retracing the path of the original beam 70) by utilising a feature of the SBS process. This is the fact that the SBS output has a small frequency shift relative to the input beams. This frequency shift gives rise to a "coherence length" for the phase locking. This coherence length is typically in the order of 10 cm. The result is that in order for two phase conjugated sub beams to reconstruct the original beam at a beam splitter, the difference in their path lengths (as measured from the beam splitter to the focus in the SBS cell) must be a multiple of the coherence length. If the difference is out by half a coherence length all of the phase conjugate light will exit from the other face of the beam splitter; (intermediate values of path length difference produce beams exiting from both faces of the beam splitter).

Thus in the arrangement of FIG. 9 the path length differences for the beams that recombine at the partial beam spitters 72, 81 are a whole number of coherence lengths, whereas the path length difference for the beams 82', 83; and 73', 75', recombining at the first partial reflector 71 are out by half a coherence length as measured down either of the sub beams.

We claim:

1. A phase locked phase conjugation system, suitable for use with laser amplifiers, comprising:

means for providing a beam of laser light (50, 70);

means (53, 71, 72, 76, 81, 87) for splitting the beam into sub-beams (9, 11, 12, 54, 55, 73, 75, 82, 83);

a first (1) and a second (2, 20) Brillouin (SBS) cell capable of providing phase conjugation;

means for collimating one of the sub-beams (9, 55, 73) and directing (53, 60, 61, 71, 72) the collimated sub-beam (55, 73) through the first SBS cell (1);

means (10, 20, 62, 63, 64, 65) for directing and focusing the collimated sub-beam (9, 55, 73) from the first SBS cell (1) into the second cell (20) so that a phase conjugated sub-beam is reflected and returned (9') from the second SBS cell (2, 20) back into the first SBS cell (1) for mixing with the original collimated sub-beam;

means (13, 14, 78, 79, 85, 86, 89, 90, 80) for directing and focusing at least two or more sub-beams (11, 12, 75, 82, 83) into the first SBS cell (1) to overlap with the collimated sub-beam (9, 73) at different regions of the volume traversed by the collimated sub-beam (9, 73); and means (51, 53, 71) for recombining at least some of the sub-beams into a single coherent light beam (66, 91);

the arrangement being such that phase locked phase conjugation of the sub-beams occur within the volume within the first SBS cell, (1) and the recombined light beam (66, 91) has a spatial phase substantially the same as the original beam (50, 70).

2. A laser amplifier comprising the phase locked phase conjugation system of claim 1 in combination with laser amplifiers (67, 68, 74, 77, 84, 82) through which the sub-beams pass at least once;

the laser amplifiers comprising a laser amplifying medium with means for supplying pump energy into the medium;

the arrangement being such that a laser beam is amplified with phased locked conjugation, to provide a single amplified laser beam.

3. The amplifier of claim 2 wherein the second SBS cell (2, 4, 7, 8) is a simple reflective phase conjugation cell capable of receiving a single focused sub beam (9) and providing phase conjugation of the received focused sub beam.

4. The amplifier of claim 2 wherein the second SBS cell (20) forms an SBS loop configuration (having a transmissive SBS medium cell (21) with means (22, 23, 24, 25, 62, 63, 64, 65) for providing optical feedback of the Brillouin scattered light into the second SBS cell so that phase conjugation occurs in the second SBS cell (21).

5. The amplifier of claim 2 wherein the second SBS cell (20) forms an SBS loop configuration having a transmissive SBS medium cell (21) with means (22, 23, 24, 25, 62, 63, 64, 65) for directing and focusing a collimated beam in at least three separate paths through the medium with overlapping of two paths so that phase conjugation occurs at the overlapping region.

6. The amplifier of claim 2 and including means (57) for adjusting the relative path lengths of the sub beams (54, 55) whereby phase conjugated light returning from the second SBS cell (20) enters the first SBS cell (1) ahead of other sub beams.

7. The amplifier of claim 2 and including means (57) for adjusting the relative path lengths of the sub beams (54, 55) whereby returning amplified sub beams recombine substantially to form an amplified single beam.

8. The amplifier of claim 2 wherein the amplifying medium is Nd:YAG.

9. The amplifier of claim 2 wherein the SBS medium is liquid Titanium Tetrachloride.

* * * * *